April 19, 1955  F. LORENZ  2,706,308
PROCESS OF FORMING HOLLOW ARTICLES OF THERMOPLASTIC
MATERIAL AND APPARATUS FOR CARRYING OUT THE PROCESS
Filed May 8, 1952                                        2 Sheets-Sheet 1

*INVENTOR.*
FRIEDRICH LORENZ
BY
*ATTORNEY*

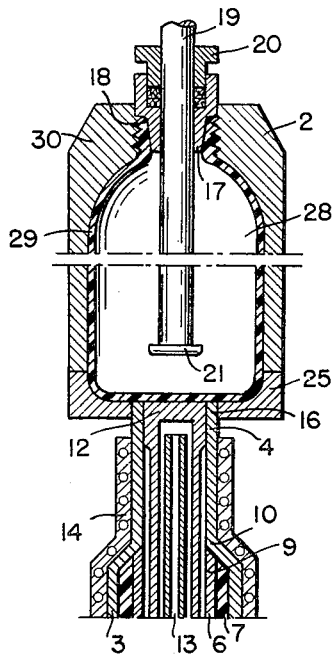
FIG. 6
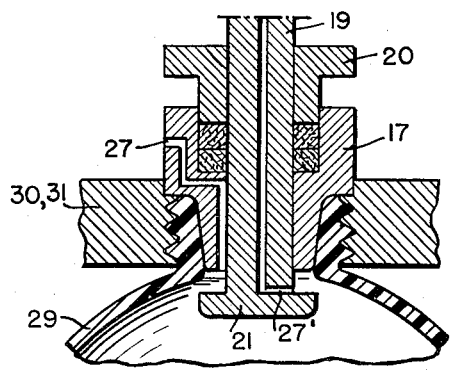
FIG. 7
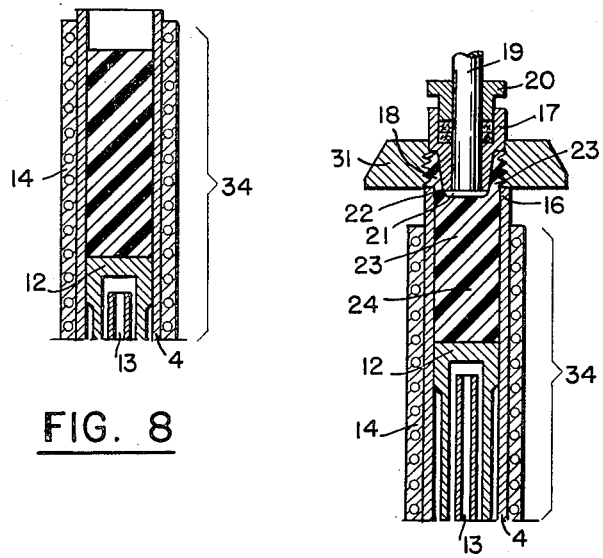
FIG. 8   FIG. 9
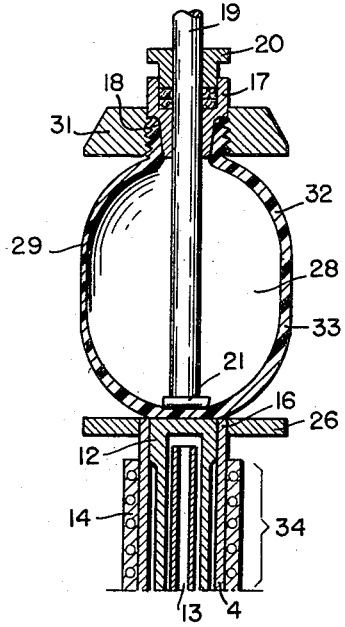
FIG. 10
INVENTOR.
FRIEDRICH LORENZ
BY
ATTORNEY

2,706,308

United States Patent Office

Patented Apr. 19, 1955

2,706,308

PROCESS OF FORMING HOLLOW ARTICLES OF THERMOPLASTIC MATERIAL AND APPARATUS FOR CARRYING OUT THE PROCESS

Friedrich Lorenz, Ludwigshafen (Rhine), Germany

Application May 8, 1952, Serial No. 286,728

5 Claims. (Cl. 18—5)

This invention relates to methods and apparatus for forming hollow articles from organic material in plastic condition.

The object of this invention is to provide a novel and improved apparatus for producing hollow articles in an efficient and economical manner.

The advantages of the invention will become apparent from the detailed description thereof which follows taken in connection with the accompanying drawings wherein:

Fig. 6 is an illustration of a further view of the structure illustrated in Fig. 4 showing the completion of the molding operation.

Fig. 7 is a view of the upper portion of the structures described above showing the details of construction of the fluid inlet passageways.

Fig. 8 shows a vertical section of a hollow cylinder, a piston and a heating jacket that form a cartridge-like set which can be combined with a blowing apparatus for forming a hollow molded article.

Fig. 9 is a vertical section showing the general organization of the structure of Fig. 8 in operative combination with a blowing device showing the initial stage in the formation of a hollow article.

Fig. 10 is a view showing the structure of Fig. 9 in the stage where the hollow article has been completely formed without using a mold for shaping the body of the hollow article.

Figure 1:
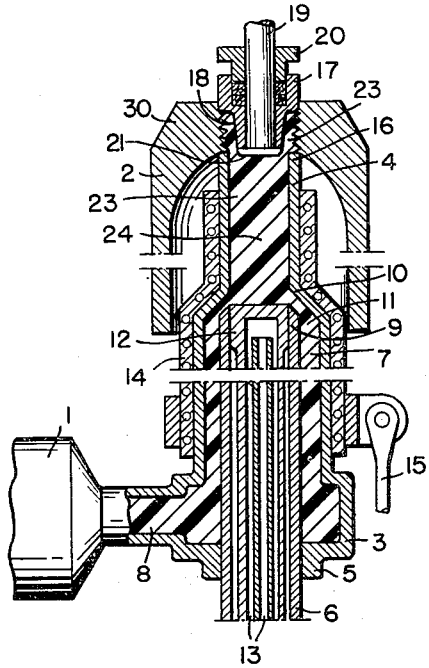
Fig. 1 is a central vertical section of the general organization of an apparatus illustrative of this invention showing the step of filling the apparatus with the initial charge of the plastic material to be formed into a molded article.

Referring to Fig. 1, there is shown at 1 an apparatus for bringing the organic material into plastic working condition. This apparatus 1 may be of any suitable type known in the art, and it will be understood that such apparatus does not constitute part of this invention. In Figs. 1 to 6 the mold is designated by the numeral 2 and the casing by the numeral 3. The mold 2 is divided vertically into sections. These die-sections may be mounted for opening and closing movements and clamped in closed position by suitable means (not shown). The upper part of the casing 3 has the form of a hollow cylinder 4 and the lower part of the casing 3 forms a guide 5 for the sleeve 6. The casing 3 and the sleeve 6 form a ring-shaped channel 7.

The interior of the casing is connected to the apparatus 1 by a channel 8 of any suitable form.

The head 9 of the sleeve 6 is in the form of a valve or cut-off which is adapted to engage a seat 10 in the casing 3. The sleeve 6 and the hollow cylinder 4, forming part of casing 3, may be reciprocated relative to each other by suitable means (not shown). When removed from each other, the head 9 of the sleeve 6 and the seat 10 of the casing 3 form a passage 11. The piston 12 fits in the hollow cylinder 4 and in the sleeve 6. The piston 12 and the head 9 of the hollow cylinder 4 may be reciprocated relative to each other by suitable means (not shown). The piston 12 is provided with internal passages 13 for circulation of a temperature controlling medium.

The casing 3 is surrounded by a heating jacket 14 which slidingly fits on the casing 3. The heating jacket 14 and the casing 3 may be reciprocated relative to each other by lever 15 and/or other suitable means (not shown).

The jacket 14 may have the form of an electric heating element, or of a ring-shaped body, provided with internal passages for circulation of a temperature controlling medium. These details are not shown as they are well known in the art. The head 16 of the hollow cylinder 4 is tapered to fit tightly on the mold 2. The casing 3 and the mold 2 may be reciprocated relative to each other by suitable means (not shown). The neck-core or pin 17 is centrally positioned in the neck-mold cavity 18 and fits tightly into the mold body 2. The rod 19 fits slidingly within the neck-core or pin 17 and is tightened or secured by a stuffing box 20.

The head 21 of the rod 19 and the head 16 of the hollow cylinder 4 form an annular nozzle 22. The sectional area of flow of the annular nozzle 22 depends on the position of the head 21 of the rod 19 and the head 16 of the hollow cylinder 4 relative to each other. The movements of the rod 19 and of the hollow cylinder 4 relative to each other are coordinated by suitable means (not shown) in such a way that the sectional area of flow of the annular nozzle 22 always corresponds to the particular needs of the different steps to be performed when working by my method, especially in order to regulate the wall thickness of the hollow article to be formed. It may be mentioned that it is not the function of the annular nozzle to provide a cut-off.

When the head 16 of the hollow cylinder 4 and the body of the mold 2 contact each other, and simultaneously the head 9 of the sleeve 6 and the seat 10 of the casing 3 contact each other, the mold 2, the hollow cylinder 4, the upper part of sleeve 6, the piston 12, the neck-core or pin 17 form a cavity 23 which is called initial blank form in this description and which has a neck part 18 and a cylindrical part 24.

The neck part 18 of the initial blank forming cavity 23 is formed by the neck part 30 of the mold body 2 and the neck-core or pin 17. The cylindrical part 24 of the initial blank forming cavity 23 is formed by the hollow cylinder 4, the piston 12 and the upper part of sleeve 6.

It will be observed, that in my invention the hollow cylinder 4 has a completely free cavity in which a piston 12 can be reciprocated, and that the rod 19 having the head 21, which later forms part of the annular nozzle 22, is arranged outside of said hollow cylinder 4.

Figure 4:
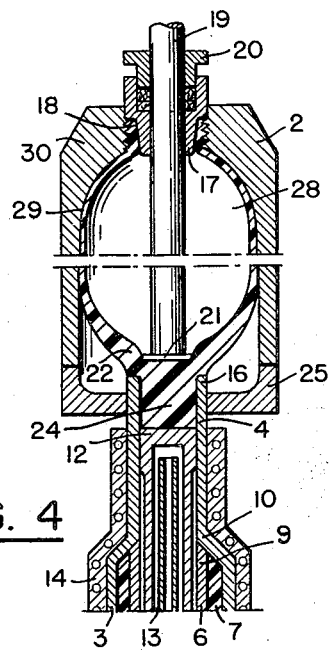
Fig. 4 is a view of a portion of the structure illustrated in Fig. 1 showing a further step in the continued development of the molded article.
Figure 5:
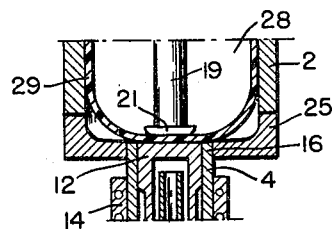
Fig. 5 is a view of the portion of the structure illustrated in Fig. 4 showing the approach to the final development of the base of the molded article being formed.

Figs. 4, 5 and 6 show the bottom mold 25 which is vertically divided into sections mounted on hinge pins (not shown) for opening and closing operations.

Fig. 10 shows a modification 26 of the bottom mold.

The head 16 of the hollow cylinder 4 and the upper edge of the piston 12 may be brought into a position substantially flush with the upper edge of the bottom mold 25 or 26 as shown in Figs. 5, 6 and 10.

In Fig. 7 there are illustrated two possibilities of arranging passages 27 and 27' for the introduction of fluid under pressure into the interior 28 of the hollow body 29 to be produced. The passages are closed when the head 21 of the rod 19 and the neck-core or pin 17 contact each other. They are opened when the head 21 and the pin 17 are withdrawn from each other. The mold 2, the bottom mold 25 or 26 and the rod 19 may contain passages for temperature-controlling medium, or other heat exchange means may be provided throughout the apparatus as desired. These are so well known in the art, that they have been omitted in the drawing to simplify the description of the invention.

In performing my novel method with the apparatus described, the parts are held in assembled relation as illustrated in Fig. 1, and plastic material is extruded from the plasticizing apparatus 1 through the channel 8, the ring-shaped channel 7, and the passage 11 into the cavity 23 of the initial blank form.

When there is enough plastic material introduced into the cavity of the initial blank forming cavity 23 to form the hollow article 29 to be produced, the passage 11 is closed by bringing the head 9 of the sleeve 6 and the seat 10 of the casing 3 into contact with each other. Thus the plastic material which is to form the hollow article is confined in the initial blank forming cavity 23.

Figure 2:
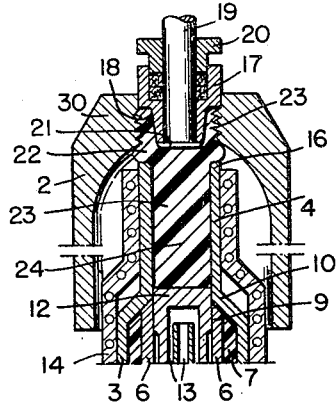
Fig. 2 is a view of the upper portion of the structure illustrated in Fig. 1 showing a succeeding step of finishing the neck of the article and the initial development of the body portion thereof.

In the next step the piston 12 and the head 16 of the hollow cylinder 4 are moved toward each other until the initial blank forming cavity 23, consisting of a neck-finish part 18 and of a solid cylinder 24, is cleanly shaped and well defined. Then the head 16 of the hollow cylinder 4 and the mold 2 are disengaged as shown in Fig. 2. Thereby a very small portion of the plastic material, filling the cavity 23 of the initial blank form under pressure, may, as shown in Fig. 2, extrude into the cavity of the mold 2. The heating jacket 14 which has been withdrawn from the head 16 of the hollow cylinder 4, whilst this cylinder has been engaged with the mold 2, may now be advanced to the head 16 of the hollow cylinder 4 in order to keep the cylinder hot during the extrusion of the plastic material through the annular nozzle 22.

Figure 3:
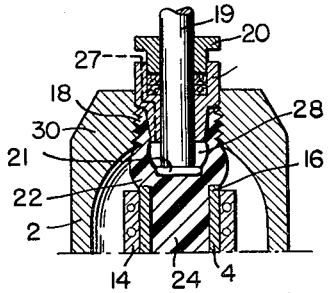
Fig. 3 is a view of the apparatus illustrated in Fig. 2 showing the continued development of the body portion of the article being formed.

The next step, which is illustrated in Figs. 3 and 4, comprises the simultaneous performance of the following operations (a, b, c, d):

(a) The head 16 of the hollow cylinder 4 is withdrawn from the mold.
(b) The head 21 of the rod 19 is moved away from the neck-core or pin 17.
(c) The plastic material filling the cavity of the cylindrical part 24 of the initial blank forming cavity 23 is extruded in annular cross section through the annular nozzle 22, which is formed by the head 16 of the hollow cylinder 4 and the head 21 of the rod 19, illustrated in Figs. 4, 6 and 10. The extruded plastic material surrounds the rod 19, the head 21 of which is part of the annular nozzle 22.
(d) Fluid under pressure is introduced through the channels 27 and/or 27' to expand that part of the plastic material which is between the neck finish part 18 of the mold and the annular nozzle 22.

The proper and desired time relations between the several operations (a, b, c, d) in order to obtain proper and desired wall thickness of the hollow article to be formed are maintained by timing means (not shown).

The neck part 30 of the mold 2 may be cooled to set the neck portion 18 of the blank 23 whilst the hollow cylinder 4 and the piston 12 are heated to maintain the initial heat of the plastic material during extrusion.

When the head 16 of the hollow cylinder 4 has reached a definite distance from the neck part 30 of the mold, as is shown in Fig. 4, the heating jacket 14 is withdrawn from the head 16 of the hollow cylinder 4, and the bottom mold 25 is closed by suitable means (not shown).

To form the bottom of the hollow article 29 to be produced, the head 16 of the hollow cylinder 4 and the piston 12 are, as Figs. 5, 6 and 10 illustrate, brought to a position substantially flush with the upper edge of the bottom mold 25.

When the extrusion of the cylindrical part 24 of the blank 23 through the annular nozzle 22 is completed, a cooling instead of a heating medium may be circulated through the passages 13 of piston 12 to set the material from the bottom of the hollow article 29 to be formed. Thus the formation of a clean bottom of the hollow article 29 is achieved in a very efficient way.

In my invention it is thus possible to form a cleanly shaped neck part as well as a cleanly shaped bottom part.

To remove the hollow article 29 from the cavity of the mold 2 and of the bottom mold 25 or 26, these molds are opened, the head 21 of the rod 19 is returned to the position shown in Fig. 1, and the head 16 of the hollow cylinder 4 and the neck-core or pin are withdrawn from their respective positions.

In the modified form of this invention illustrated in Figs. 9 and 10, the mold consists of a neck mold body 31 and a bottom mold body 26 only, the middle part of the mold being omitted. In performing my novel method with the apparatus last described, the shoulder portion 32 and the body portion 33 of the article 29 to be produced are, as illustrated in Figs. 9 and 10, shaped without a die. In order to modify the shape and the wall thickness of the hollow article 29 thus to be produced the various operations to be performed in this modification of the method are timed appropriately in such a way that the wall of the hollow article being formed solidifies without touching the surface of the mold. By shaping the shoulder portion 32 and the body portion 33 of the hollow article to be produced without a die, the exterior surface of the hollow article is not smooth as is the case when the whole hollow article is made in a die, but shows irregularities which are of interest, e. g., for obtaining attractive surface effects.

In a second modification of this invention, illustrated in Figs. 8, 9 and 10, the hollow cylinder 4, the piston 12 and the heating jacket 14 form a set or combination 34 which can be inserted like a cartridge into the blowing apparatus proper by means generally well known in the art of engineering and not shown in the drawing.

In making a hollow article with the apparatus as thus last described, the organic material is introduced into the hollow cylinder 4 by means well known in this art (not shown) whilst said cartridge-like set 34 is outside the blowing apparatus proper. Then said cartridge-like set 34 is inserted into the blowing apparatus proper and the hollow article to be produced is formed as described above.

Said cartridge-like set 34 having been filled with plastic material may be brought into a heating oven to equalize temperature differences in the interior of the plastic material, which is important, when the hollow article is shaped without a die as described above, because even the slightest differences in temperature within the plastic material will cause misshapen hollow bodies.

In the modification of the method described above, the material is introduced into said hollow cylinder 4 in a non-plastic condition, e. g., as commercially supplied. After it has been introduced into the hollow cylinder 4, the material is heated and thus brought into plastic condition without kneading. To prevent air bubbles from becoming enclosed or entrapped in the material during the heating process and in order to sinter and weld the different particles of the material into a homogenous mass, the heating may be performed under vacuum and/or under mechanical pressure by means of piston 12, heating jacket 14, and other suitable means (not shown) as known in the art. The modification of my invention thus last described is of importance when multi-colored hollow articles are to be produced. In this case, a mixture of granulated material of different colors is introduced into the hollow cylinder 4. This mixture is then made plastic as described above without homogenization of the different components, no kneading of the material being effected.

Instead of using a mixture of granulated material of different colors a mixture of various components of granulated material differing from each other in properties other than color, e. g., the k-value, may be processed thus producing hollow articles with pronounced irregularities on the surface.

Another modification of my invention comprises the cooling of the uppermost part of the head 16 of hollow cylinder 4 and/or of the head 21 of the rod 19 by well known means (not shown) during extrusion of plastic material through the annular nozzle 22. Thereby, the outermost skin of the plastic material being extruded through the annular nozzle 22 solidifies and this outermost skin is crazed by the expansion of the extruded materials, such scarring or crazing providing interesting surface effects.

I claim:
1. The method of molding hollow plastic objects which comprises: molding an initial one piece starting blank, said blank having a neck finish part and a solid cylindrical part, the diameter of said solid cylindrical part being smaller than that of the hollow article to be formed, then moving the molded neck finish part of the blank and the plastic material constituting said solid cylindrical part relative to each other and simultaneously extruding the plastic material constituting said cylindrical part progressively and with tubular cross-section in such a way as to maintain coherence between said molded neck finish part and said cylindrical part, and simultaneously expanding the plastic material which has been extruded and is positioned between the neck finish part and said solid cylindrical part by applying a fluid pressure medium to said plastic material until the hollow article is finished.

2. Method as claimed in claim 1 which comprises introducing said plastic material from which the initial blank is to be formed in such a way as to mold the solid cylindrical part of said blank first.

3. In an apparatus for molding plastic objects in a mold, a mold body having a mold cavity and a casing, the casing being coaxially positioned in the cavity of the mold, the upper part of the casing forming a hollow cylinder projecting coaxially into the cavity of the mold, the head of said hollow cylinder being tapered to fit tightly against the mold body which forms said mold cavity, said hollow cylinder and said mold body being supported in such a way as to be able to reciprocate coaxially relative to each other, and a neck-core coaxially positioned in and fitting tightly into said mold body, a rod provided with a head and arranged coaxially and slidably in the neck-core, a stuffing box sealing said core and said rod, said rod being disposed outside of and aligned lengthwise with said hollow cylinder, the cavity of said hollow cylinder being completely free for a piston to reciprocate in the cavity of said hollow cylinder, said head of said rod and said head of said cylinder thereby forming an annular nozzle, a piston running in said hollow cylinder to extrude plastic material through said annular nozzle, a bottom part of the mold fitting around said cylinder, a channel arranged in said neck-core and means for introducing fluid under pressure through said channel into the interior of said hollow article to be formed.

4. An apparatus as claimed in claim 3 wherein a movable sleeve is arranged coaxially with said hollow cylinder, the internal diameter of said sleeve being equal to the internal diameter of said hollow cylinder, the upper end of said sleeve being tapered to fit tightly on the end of said hollow cylinder, the upper end of said sleeve and the lower end of said hollow cylinder forming an inlet for plastic material when separated from each other, said piston fitting slidably within said sleeve.

5. Apparatus in accordance with claim 3 wherein the mold consists of a neck portion and a bottom portion only.

References Cited in the file of this patent

UNITED STATES PATENTS

| | | |
|---|---|---|
| 688,924 | Blair et al. | Dec. 17, 1901 |
| 2,288,454 | Hobson | June 30, 1942 |
| 2,331,688 | Hobson | Oct. 12, 1943 |
| 2,469,130 | Rodman, Jr. | May 3, 1949 |

FOREIGN PATENTS

| | | |
|---|---|---|
| 878,105 | Germany | Apr. 16, 1953 |